(12) United States Patent
Takayama et al.

(10) Patent No.: US 11,261,270 B2
(45) Date of Patent: Mar. 1, 2022

(54) POLYVINYL ALCOHOL AND METHOD FOR PRODUCING POLYVINYL ALCOHOL

(71) Applicants: KURARAY CO., LTD., Kurashiki (JP); UNIVERSITE DE LIEGE, Liege (BE)

(72) Inventors: Takumi Takayama, Kurashiki (JP); Kazuhiko Maekawa, Kurashiki (JP); Christophe Detrembleur, Liege (BE); Antoine Debuigne, Liege (BE); Christine Jerome, Liege (BE)

(73) Assignees: KURARAY CO., LTD., Kurashiki (JP); UNIVERSITE DE LIEGE, Liege (BE)

( * ) Notice: Subject to any disclaimer, the term of this patent is extended or adjusted under 35 U.S.C. 154(b) by 223 days.

(21) Appl. No.: 16/630,282

(22) PCT Filed: Jul. 11, 2018

(86) PCT No.: PCT/JP2018/026233
§ 371 (c)(1),
(2) Date: Jan. 10, 2020

(87) PCT Pub. No.: WO2019/013267
PCT Pub. Date: Jan. 17, 2019

(65) Prior Publication Data
US 2020/0216584 A1    Jul. 9, 2020

(30) Foreign Application Priority Data

Jul. 11, 2017  (JP) .............................. JP2017-135804
Jul. 11, 2017  (JP) .............................. JP2017-135805

(51) Int. Cl.
*C08F 16/06*     (2006.01)
*C08F 2/38*      (2006.01)
*C08F 8/12*      (2006.01)

(52) U.S. Cl.
CPC ................ *C08F 16/06* (2013.01); *C08F 2/38* (2013.01); *C08F 8/12* (2013.01)

(58) Field of Classification Search
CPC ............. C08F 18/08; C08F 2/38; C08F 16/06
See application file for complete search history.

(56) References Cited

U.S. PATENT DOCUMENTS 3,832,423 A    8/1974  Milkovich et al.
2019/0119414 A1  4/2019  Takayama et al.

FOREIGN PATENT DOCUMENTS

| JP | 54-33589 | 3/1979 |
|---|---|---|
| JP | 6-93016 A | 4/1994 |
| JP | 11-147914 A | 6/1999 |
| JP | 2001-19770 A | 1/2001 |
| JP | 2007-308665 A | 11/2007 |
| WO | WO 2017/170974 A1 | 10/2017 |

OTHER PUBLICATIONS

International Search Report dated Oct. 2, 2018 in PCT/JP2018/026233 filed Jul. 11, 2018, 1 page.
Iovu et al., "Controlled/Living Radical Polymerization of Vinyl Acetate by Degenerative Transfer with Alkyl Iodides," Macromolecules, vol. 36, No. 25, 2003, pp. 9346-9354.
Debuigne et al., "Highly Efficient Cobalt-Mediated Radical Polymerization of Vinyl Acetate," Angewandte Chemie International Edition, vol. 44, 2005, pp. 1101-1104.
Debuigne et al., "Synthesis of End-Functional Poly(vinyl acetate) by Cobalt-Mediated Radical Polymerization," Macromolecules, vol. 38, No. 13, 2005, pp. 5452-5458.
U.S. Appl. No. 16/089,441, filed Sep. 28, 2018, Yusuke Amano et al.

*Primary Examiner* — Mark S Kaucher
(74) *Attorney, Agent, or Firm* — Oblon, McClelland, Maier & Neustadt, L.L.P.

(57) ABSTRACT

A polyvinyl alcohol has a number-average molecular weight (Mn) from 4,400 to 440,000, a molecular weight distribution (Mw/Mn) from 1.05 to 1.70, a degree of saponification from 80 to 99.99 mol %, wherein the polyvinyl alcohol contains an end group represented by a formula (I) below, and a molar ratio (X) of the end group based on total monomer units and the number-average molecular weight (Mn) satisfy a formula (1) below. Such a polyvinyl alcohol has a narrow molecular weight distribution and a high number-average molecular weight with hue good.

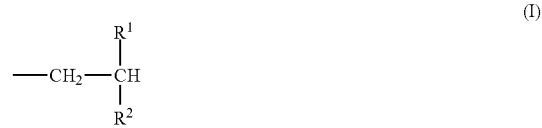

(I)

(In the formula, $R^1$ denotes an optionally substituted aromatic group having a carbon number from 6 to 20, and $R^2$ denotes a hydrogen atom, an alkyl group having a carbon number from 1 to 20, or an optionally substituted aromatic group having a carbon number from 6 to 20.)

$$X \cdot Mn/44 \geq 0.5 \quad (1)$$

12 Claims, 2 Drawing Sheets

POLYVINYL ALCOHOL AND METHOD FOR PRODUCING POLYVINYL ALCOHOL

TECHNICAL FIELD

The present invention relates to a polyvinyl alcohol having a narrow molecular weight distribution and a high number-average molecular weight with good hue. The present invention also relates to a method for producing a polyvinyl alcohol suitable for production of such a polyvinyl alcohol.

BACKGROUND ART

Polyvinyl alcohol resins are crystalline water-soluble polymer materials and are widely applied to emulsifiers, suspensions, surfactants, fiber treating agents, various binders, paper treating agents, adhesives, films, and the like using their excellent water solubility and film properties (strength, grease resistance, film formability, oxygen gas barrier properties, etc.). Conventionally, polyvinyl alcohols having different degrees of saponification and polymerization are employed depending on the use. Various modified polyvinyl alcohols with special functions by introducing a functional group into polyvinyl alcohols are proposed.

Polyvinyl alcohols are industrially produced by saponification of polyvinyl acetate that is obtained by radically polymerizing vinyl acetate. In radical polymerization reaction of vinyl acetate, various types of side reaction, such as chain transfer reaction and recombination termination reaction, occur during the polymerization, and thus it is generally considered difficult to precisely control the molecular weight distribution, the end structure, and the like of the polyvinyl acetate (and polyvinyl alcohols) thus obtained. For improvement in thermal stability and mechanical properties of polyvinyl alcohols, polymers having a less content of a low molecular weight polymer, that is, polymers having a high molecular weight and a narrow molecular weight distribution are considered preferred.

In recent years, with the advances in the so-called living radical polymerization technique, some methods for controlling radical polymerization reaction of vinyl acetate have been proposed. For example, a method is proposed that comprises radical polymerization reaction of vinyl acetate in the presence of a radical polymerization initiator and a specific control agent to obtain polyvinyl acetate having a narrow molecular weight distribution. In such polymerization reaction, a propagating radical end of the molecular chain of polyvinyl acetate is covalently bonded with the control agent to form dormant species. The polymerization progresses while establishing an equilibrium between the dormant species and radical species generated by dissociation of the dormant species. Such polymerization reaction is referred to as controlled radical polymerization.

However, it used to be difficult to obtain polyvinyl acetate with a high molecular weight by controlled radical polymerization in the past. This is considered to be because a radical is thermally extremely unstable that is generated at an end of a head-to-head bond (a bond having acetyl groups of vinyl acetate adjacent to each other) generated with a certain probability during the polymerization and the equilibrium is thus largely shifted to the dormant species side, resulting in no further progress of the polymerization reaction. In contrast, in a case where the polymerization temperature is raised to promote thermal dissociation of the dormant species, the controllability becomes worse in spite of the progress of the reaction. Accordingly, it has been extremely difficult to obtain polyvinyl acetate with a high molecular weight while maintaining controllability.

Regarding such a problem, Patent Document 1 reports an example in which radical polymerization reaction of vinyl acetate is performed in the presence of a control agent containing a radical polymerization initiator and an iodine compound, thereby synthesizing polyvinyl acetate having a number-average molecular weight (Mn) of 92,000 and a molecular weight distribution (Mw/Mn) of 1.57 and saponifying it to produce a polyvinyl alcohol. However, in the polymerization method using an iodine compound as a control agent, it is known that an aldehyde group is formed at a polymerization end of polyvinyl acetate (e.g., refer to Non-Patent Document 1). In a case of saponifying such polyvinyl acetate having an aldehyde group at an end, it is known that a conjugated polyene structure where plural carbon-carbon double bonds are conjugated is formed to obtain markedly colored polyvinyl alcohols.

Recently, a technique has been proposed to synthesize polyvinyl acetate having a narrow molecular weight distribution and a high molecular weight by controlled radical polymerization using an organic cobalt complex as a control agent. In the polymerization reaction, the propagating radical end of the molecular chain of polyvinyl acetate is covalently bonded with a cobalt atom of an organic cobalt complex to form dormant species. The polymerization progresses while establishing equilibrium between the dormant species and radical species generated by dissociation of the dormant species. For example, Non-Patent Document 2 reports an example in which vinyl acetate is polymerized in the presence of cobalt (II) acetylacetonate, thereby synthesizing polyvinyl acetate having a number-average molecular weight (Mn) of 99,000 and a molecular weight distribution (Mw/Mn) of 1.33.

Non-Patent Document 3 describes that a polyvinyl acetate chain obtained by polymerizing vinyl acetate in the presence of cobalt (II) acetylacetonate is treated with 1-propanethiol. While the polyvinyl acetate chain forms a dormant species bonded with a cobalt (III) complex at an end, an end radical formed by cleavage of the dormant species reacts with 1-propanethiol, thereby allowing separation of the cobalt complex from the polyvinyl acetate chain. While polyvinyl acetate forming the dormant species is green, it is described that the separated cobalt complex is precipitated, followed by filtration through celite for removal to obtain less colored polyvinyl acetate. Instead of 1-propanethiol, TEMPO (2,2, 6,6-tetramethylpiperidine 1-oxyl) as a stable radical compound may be used for bonding of TEMPO with the end radical to trap a radical. It is described that, in this case as well, the cobalt complex is filtered with acidic alumina for removal to obtain colorless polyvinyl acetate.

As just described, according to the method described in Non-Patent Document 3, it is possible to obtain less colored polyvinyl acetate. However, Non-Patent Document 3 does not describe that the polyvinyl acetate thus obtained is subjected to saponification to yield polyvinyl alcohol. As a result of experiments by the present inventors, it was found that the polyvinyl alcohol obtained by saponifying the polyvinyl acetate obtained in accordance with Non-Patent Document 3 was colored.

PRIOR ART DOCUMENT

Patent Document

Patent Document 1: JP 11-147914 A

Non-Patent Document

Non-Patent Document 1: Controlled/Living Radical Polymerization of Vinyl Acetate by Degenerative Transfer with Alkyl Iodides, Macromolecules, 2003, vol. 36, p 9346-9354

Non-Patent Document 2: Highly Efficient Cobalt-Mediated Radical Polymerization of Vinyl Acetate, Angewandte Chemie International Edition, 2005, vol. 44, p 1101-1104

Non-Patent Document 3: Synthesis of End-Functional Poly(vinyl acetate) by Cobalt-Mediated Radical Polymerization, Macromolecules, 2005, vol. 38, p 5452-5458

SUMMARY OF THE INVENTION

Problems to be Solved by the Invention

The present invention has been made to solve the above problems, and it is an object thereof to provide a polyvinyl alcohol having a narrow molecular weight distribution and a high number-average molecular weight with good hue. It is another object thereof to provide a method for producing such a polyvinyl alcohol.

Means for Solving the Problems

The above problems are solved by providing a polyvinyl alcohol having a number-average molecular weight (Mn) from 4,400 to 440,000, a molecular weight distribution (Mw/Mn) from 1.05 to 1.70, a degree of saponification from 80 to 99.99 mol %, wherein the polyvinyl alcohol contains an end group represented by a formula (I) below, and a molar ratio (X) of the end group based on total monomer units and the number-average molecular weight (Mn) satisfy a formula (1) below.

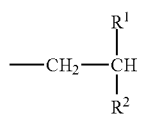

(I)

(In the formula, $R^1$ denotes an optionally substituted aromatic group having a carbon number from 6 to 20, and $R^2$ denotes a hydrogen atom, an alkyl group having a carbon number from 1 to 20, or an optionally substituted aromatic group having a carbon number from 6 to 20.)

$$X \cdot Mn/44 \geq 0.5 \quad (1)$$

In this context, it is preferred that $R^1$ and $R^2$ are optionally substituted phenyl groups. It is also preferred that the polyvinyl alcohol has a yellowness index (YI) measured in accordance with ASTM D1925 of 50 or less. It is also preferred that the polyvinyl alcohol has a 1,2-glycol bond content from 0.7 to 1.5 mol %.

The above problems are also solved by providing a method for producing a polyvinyl alcohol, comprising: a polymerization step comprising polymerizing vinyl ester monomers by controlled radical polymerization in the presence of a radical initiator and an organic cobalt complex; a termination step comprising terminating the polymerization by adding a terminator represented by a formula (II) below after the polymerization step to obtain a polyvinyl ester, and a saponification step comprising saponifying the polyvinyl ester obtained in the termination step to obtain the polyvinyl alcohol.

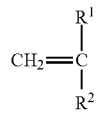

(II)

(In the formula, $R^1$ denotes an optionally substituted aromatic group having a carbon number from 6 to 20, and $R^2$ denotes a hydrogen atom, an alkyl group having a carbon number from 1 to 20, or an optionally substituted aromatic group having a carbon number from 6 to 20.)

In the above production method, it is preferred that $R^1$ and $R^2$ are optionally substituted phenyl groups. It is preferred that the polyvinyl alcohol has a number-average molecular weight (Mn) from 4,400 to 440,000, a molecular weight distribution (Mw/Mn) from 1.05 to 1.70, and a degree of saponification from 80 to 99.99 mol %. It is also preferred that the polyvinyl alcohol contains an end group represented by a formula (I) below, and a molar ratio (X) of the end group based on total monomer units and a number-average molecular weight (Mn) satisfy a formula (1) below.

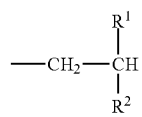

(I)

(In the formula, $R^1$ and $R^2$ are same as those in the formula (II).)

$$X \cdot Mn/44 \geq 0.5 \quad (1)$$

In the above production method, it is also preferred that the polyvinyl alcohol has a yellowness index (YI) measured in accordance with ASTM D1925 of 50 or less. It is also preferred that the polyvinyl alcohol has a 1,2-glycol bond content from 0.7 to 1.5 mol %.

It is preferred that, in the polymerization step, from 0.001 to 1 mol of the organic cobalt complex is used based on 100 mol of the vinyl ester monomers. It is also preferred that, in the termination step, from 1 to 100 mol of the terminator is added based on 1 mol of the organic cobalt complex.

Effects of the Invention

The polyvinyl alcohol of the present invention has a narrow molecular weight distribution and a high number-average molecular weight with good hue. Since the polyvinyl alcohol has high crystallinity derived from the narrow molecular weight distribution, shaped articles of the polyvinyl alcohol are excellent in gas barrier properties. The polyvinyl alcohol having the high number-average molecular weight in addition to the narrow molecular weight distribution allows production of shaped articles with high elasticity and high strength. Since the polyvinyl alcohol of the present invention has good solubility in water, it is applicable to various types of use requiring water solubility.

Since the polyvinyl alcohol has a low yellowness index (YI), it is also applicable to various types of use with importance on appearance. The production method of the present invention allows production of a polyvinyl alcohol having a narrow molecular weight distribution and a high number-average molecular weight with hue good.

MODES FOR CARRYING OUT THE INVENTION

Figure 1:
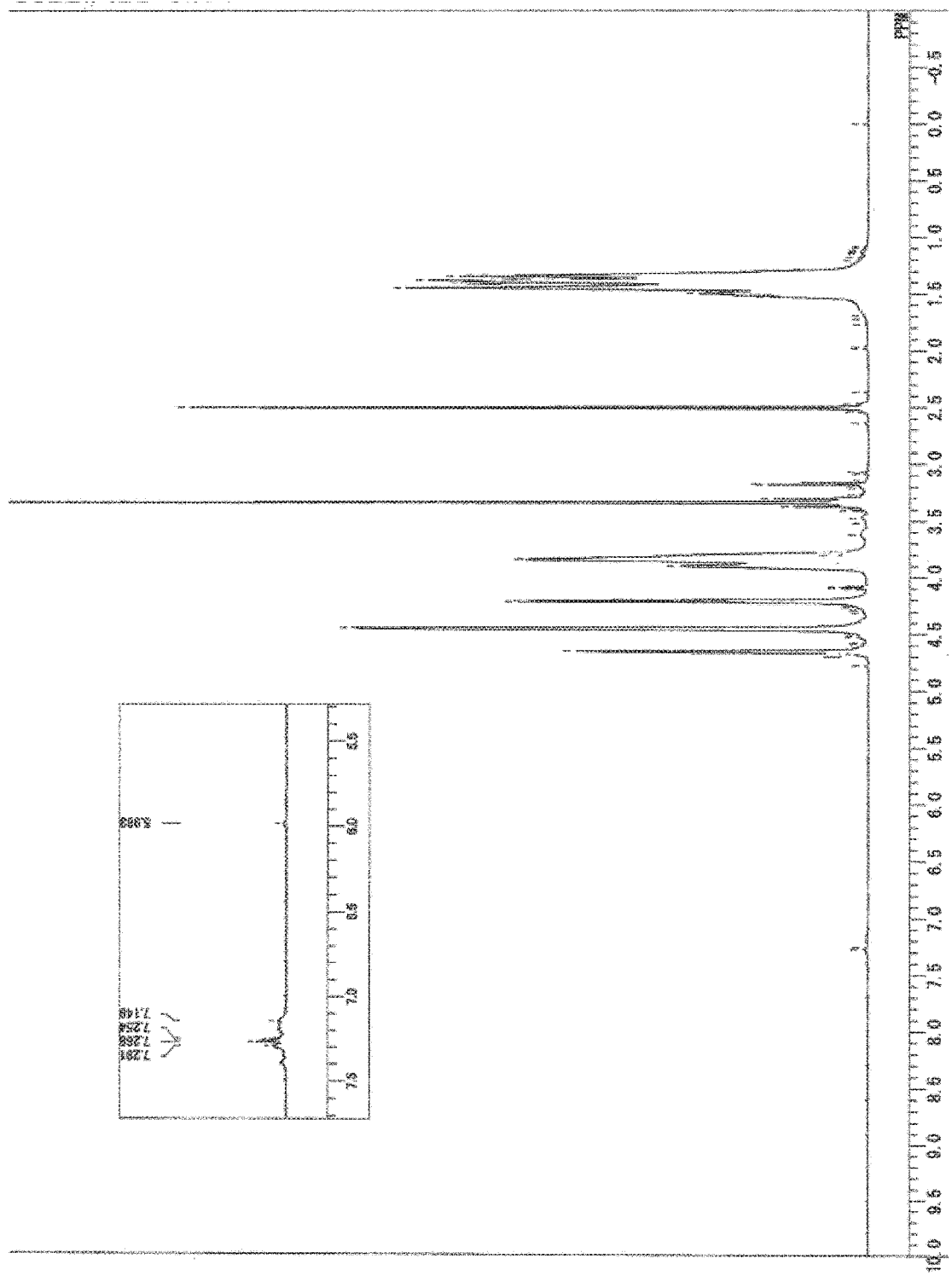
FIG. 1 is a $^1$H-NMR chart of a polyvinyl alcohol obtained in Example 1.
Figure 2:
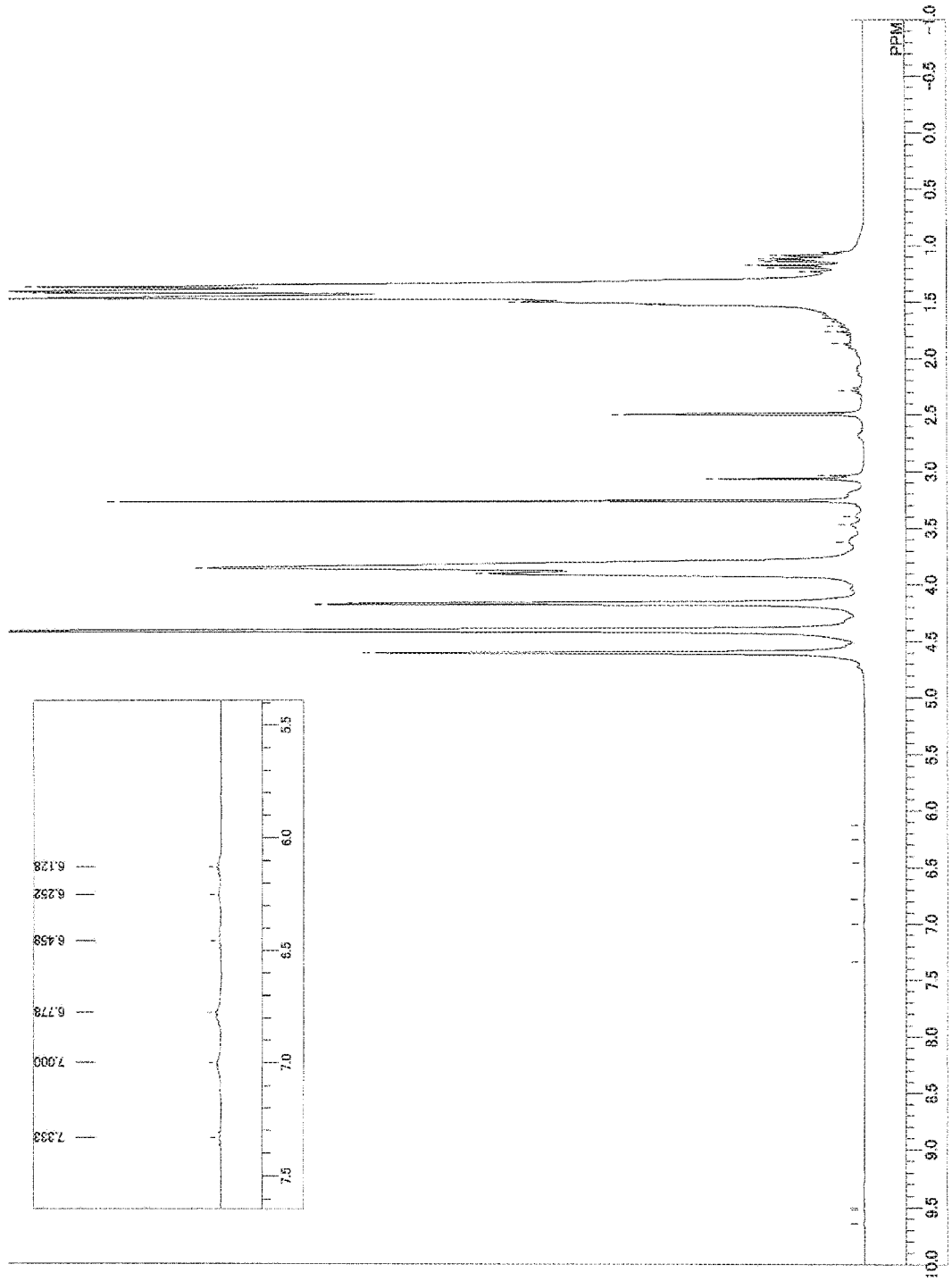
FIG. 2 is a $^1$H-NMR chart of a polyvinyl alcohol obtained in Comparative Example 6.

A polyvinyl alcohol of the present invention having a number-average molecular weight (Mn) from 4,400 to 440,000, a molecular weight distribution (Mw/Mn) from 1.05 to 1.70, a degree of saponification from 80 to 99.99 mol %, wherein the polyvinyl alcohol contains an end group represented by a formula (I) below, and a molar ratio (X) of the end group based on total monomer units and the number-average molecular weight (Mn) satisfy a formula (1) below.

(In the formula, R$^1$ denotes an optionally substituted aromatic group having a carbon number from 6 to 20, and R$^2$ denotes a hydrogen atom, an alkyl group having a carbon number from 1 to 20, or an optionally substituted aromatic group having a carbon number from 6 to 20.)

$$X \cdot Mn/44 \geq 0.5 \quad (1)$$

No polyvinyl alcohol has been previously known that has a narrow molecular weight distribution and a high number-average molecular weight with good hue. The present inventors successfully produced such a polyvinyl alcohol. A polyvinyl alcohol with good hue is provided by having the molar ratio (X) of end group represented by the formula (I) based on total monomer units and the number-average molecular weight (Mn) satisfying predetermined relationship.

A preferred method for producing the polyvinyl alcohol of the present invention includes a polymerization step comprising polymerizing vinyl ester monomers by controlled radical polymerization in the presence of a radical initiator and an organic cobalt complex; a termination step comprising terminating the polymerization by adding a polymerization terminator represented by a formula (II) below after the polymerization step to obtain a polyvinyl ester; and a saponification step comprising saponifying the polyvinyl ester obtained in the termination step to obtain the polyvinyl alcohol. The production method is described below in detail.

(In the formula, R$^1$ and R$^2$ are same as those in the formula (I).)

Firstly, the polymerization step is described. In the polymerization step, vinyl ester monomers are polymerized by controlled radical polymerization in the presence of a radical initiator and an organic cobalt complex. The controlled radical polymerization is polymerization reaction where reaction progresses in an equilibrium state between a propagating radical end (active species) and covalent species (dormant species) formed by the propagating radical end bonded with a control agent. In the present invention, an organic cobalt complex is preferably used as the control agent.

Examples of the vinyl ester monomers used in the present invention may include vinyl formate, vinyl acetate, vinyl trifluoroacetate, vinyl propionate, vinyl valerate, vinyl butyrate, vinyl isobutyrate, vinyl pivalate, vinyl caprate, vinyl laurate, vinyl stearate, vinyl benzoate, vinyl versatate, and the like. From an economic perspective, vinyl acetate is preferably used.

The polyvinyl alcohol of the present invention may contain monomer units derived from ethylenic unsaturated monomers copolymerizable with the vinyl ester monomers without impairing the effects of the present invention. Examples of such an ethylenic unsaturated monomer may include: olefins, such as ethylene, propylene, 1-butene, and isobutene; unsaturated carboxylic acids, such as acrylic acid, methacrylic acid, crotonic acid, phthalic acid (anhydride), maleic acid (anhydride), and itaconic acid (anhydride), salts thereof, mono- or di-alkyl (carbon number from 1 to 18) esters thereof, or anhydrides thereof; acrylamides, such as acrylamide, N-alkyl (carbon number from 1 to 18) acrylamide, N,N-dimethylacrylamide, 2-acrylamide propanesulfonate or salts thereof, and acrylamide propyldimethylamine or acid salts thereof or quaternary salts thereof; methacrylamides, such as methacrylamide, N-alkyl (carbon number from 1 to 18) methacrylamide, N,N-dimethylmethacrylamide, 2-methacrylamide propanesulfonate or salts thereof, and methacrylamide propyldimethylamine or acid salts thereof or quaternary salts thereof; N-vinylamides, such as N-vinyl pyrrolidone, N-vinyl formamide, and N-vinyl acetamide; vinyl cyanides, such as acrylonitrile and methacrylonitrile; vinyl ethers, such as alkyl (carbon number from 1 to 18) vinyl ether, hydroxyalkyl vinyl ether, and alkoxyalkyl vinyl ether; vinyl halides, such as vinyl chloride, vinylidene chloride, vinyl fluoride, vinylidene fluoride, and vinyl bromide; vinyl silanes, such as trimethoxyvinyl silane; allyl compounds, such as allyl acetate, allyl chloride, allyl alcohol, and dimethylallyl alcohol; trimethyl-(3-acrylamide dimethylpropyl)-ammonium chloride; acrylamide-2-methylpropanesulfonic acid; and the like.

Examples of the method for polymerizing the vinyl ester monomers may include known methods, such as bulk polymerization, solution polymerization, suspension polymerization, and emulsion polymerization. Among all, bulk polymerization in which polymerization is conducted in a nonsolvent system or solution polymerization in which polymerization is conducted in various organic solvents is usually employed. To obtain a polymer having a narrow molecular weight distribution, bulk polymerization is preferred that does not use a solvent and a dispersion medium with a possibility of side reactions, such as chain transfer. Meanwhile, solution polymerization is sometimes preferred from the perspective of viscosity control of the reaction liquid, control of the polymerization rate, and the like. Examples of the organic solvent used as the solvent in solution polymerization may include: esters, such as methyl acetate and ethyl acetate; aromatic hydrocarbons, such as benzene and toluene; lower alcohols, such as methanol and ethanol; and the like. Among them, to prevent chain transfer, esters and aromatic hydrocarbons are preferably used. The amount of the solvent may be determined considering the viscosity of the reaction solution in accordance with a target number-average molecular weight of the polyvinyl alcohol. For example, the amount is selected from a mass ratio (solvent/monomer) ranging from 0.01 to 10. The mass ratio (solvent/monomer) is preferably 0.1 or more and is preferably 5 or less.

As the radical initiator used in the polymerization step, conventionally known azo initiators, peroxide initiators, redox initiators, and the like are appropriately selected. Examples of such an azo initiator may include 2,2'-azobisisobutyronitrile, 2,2'-azobis(2,4-dimethylvaleronitrile), 2,2'-azobis(4-methoxy-2,4-dimethylvaleronitrile), and the like. Examples of such a peroxide initiator may include: percarbonate compounds, such as diisopropyl peroxydicarbonate, di-2-ethylhexyl peroxydicarbonate, and diethoxyethyl peroxydicarbonate; perester compounds, such as t-butyl peroxyneodecanate, α-cumyl peroxyneodecanate, and t-butyl peroxyneodecanate; acetylcyclohexylsulfonyl peroxide; diisobutyryl peroxide; 2,4,4-trimethylpentyl-2-peroxyphenoxy acetate; and the like. Furthermore, the above initiator can be combined with potassium persulfate, ammonium persulfate, hydrogen peroxide, or the like, to be an initiator. Examples of such a redox initiator may include combinations of the above peroxide with a reducing agent, such as sodium hydrogen sulfite, sodium hydrogen carbonate, tartaric acid, L-ascorbic acid, and Rongalite. The amount of the initiator differs according to the polymerization catalyst and thus cannot be unconditionally determined and is arbitrarily selected depending on the polymerization rate.

The organic cobalt complex used as the control agent in the polymerization step may contain a divalent cobalt atom and an organic ligand. Examples of a preferred organic cobalt complex may include cobalt (II) acetylacetonate $[Co(acac)_2]$, a cobalt (II) porphyrin complex, and the like. Among all, cobalt (II) acetylacetonate is preferred from the perspective of production costs.

In the controlled radical polymerization used in the present invention, firstly, the radical initiator is decomposed to produce a radical and the radical is bonded with a small number of vinyl ester monomers to produce a short-chain polymer having a radical at a propagating end, and the radical is bonded with an organic cobalt (II) complex, thereby producing a dormant species where an organic cobalt (III) complex is covalently bonded with at a polymer end. In a certain period after initiation of the reaction, such a short-chain polymer is produced only to be converted to dormant species and thus the degree of polymerization does not substantially increase. Such a period is referred to as an induction period. After consumption of the organic cobalt (II) complex, a growth period begins in which the degree of polymerization increases and most molecular chains in the reaction system have a molecular weight similarly increasing in proportion to polymerization time. This allows production of polyvinyl ester having a narrow molecular weight distribution.

As described above, in the controlled radical polymerization of the present invention, one polyvinyl ester chain is theoretically yielded from one molecule of the organic cobalt complex to be added. Accordingly, the amount of the organic cobalt complex to be added to the reaction liquid is determined considering target number-average molecular weight and rate of polymerization. Usually, based on 100 mol of the vinyl ester monomers, from 0.001 to 1 mol of the organic cobalt complex is preferably used.

A molar number of the generated radical not more than the molar number of the organic cobalt complex causes the polymerization reaction to progress only by a mechanism in which a cobalt complex is thermally dissociated from the dormant species, resulting in an extremely low polymerization rate depending on the reaction temperature. Accordingly, considering that the radical initiator produces two radicals, the molar number of the radical initiator to be used has to be more than ½ times the molar number of the organic cobalt complex. The amount of active radicals supplied from the initiator generally depends on initiator efficiency and thus there are actually deactivated initiators not used for the formation of dormant species. Accordingly, the molar number of the radical initiator to be used is preferably not less than one time, more preferably not less than 1.5 times, the molar number of the organic cobalt complex. Meanwhile, a molar number of the generated radical excessively more than the molar number of the organic cobalt complex causes an increase in the ratio of uncontrolled radical polymerization and thus broadening of the molecular weight distribution. The molar number of the radical initiator to be used is preferably not more than 10 times, more preferably not more than 6 times, the molar number of the organic cobalt complex.

The method for mixing the radical initiator, the organic cobalt complex, and the vinyl ester monomers is not particularly limited as long as the method is capable of producing the dormant species and controlling the increase in the degree of polymerization of the polyvinyl ester. Examples of the method may include: a method comprising mixing the radical initiator and the organic cobalt complex, followed by mixing the mixture thus obtained with the vinyl ester monomers; a method comprising mixing the radical initiator, the organic cobalt complex, and the vinyl ester monomers at one time; a method comprising mixing the organic cobalt complex and the vinyl ester monomers, followed by mixing the mixture thus obtained with the radical initiator, and the like. The radical initiator, the organic cobalt complex, and the vinyl ester monomers may be mixed by dividing them. Examples of this method may include: a method comprising mixing the radical initiator and the organic cobalt complex with part of the vinyl ester monomers, thereby producing a dormant species where an organic cobalt (III) complex is covalently bonded with a short-chain polyvinyl ester at an end, followed by mixing the dormant species with the remaining vinyl ester monomers to increase the degree of polymerization; and the like. The dormant species may be isolated as a macroinitiator and then mixed with the remaining vinyl ester monomers to increase the degree of polymerization.

The polymerization temperature is preferably, for example, from 0° C. to 80° C. A polymerization temperature of less than 0° C. causes an insufficient polymerization rate and thus productivity is prone to be reduced. In this regard, the polymerization temperature is more preferably 10° C. or more and even more preferably 20° C. or more. Meanwhile, a polymerization temperature of more than 80° C. is prone to cause broadening of the molecular weight distribution of a polyvinyl ester to be obtained. In this regard, the polymerization temperature is more preferably 65° C. or less and even more preferably 50° C. or less.

In the polymerization step, at the target rate of polymerization, the polymerization reaction is terminated by adding a polymerization terminator represented by the formula (II)

above. In the formula (II) above, $R^1$ denotes an optionally substituted aromatic group having a carbon number from 6 to 20. When $R^1$ is an aromatic group having a substituent, the carbon number including carbons in the substituent has to be in the above range. The aromatic group used as $R^1$ preferably has a carbon number of 10 or less. The aromatic group used as $R^1$ may be either an aromatic hydrocarbon group or a heteroaromatic group while the former is preferred. Examples of the aromatic hydrocarbon group used as $R^1$ may include a phenyl group, a biphenyl group, a naphthyl group, an anthryl group, a phenanthryl group, and the like, and among all, a phenyl group is preferred.

$R^1$ may be an aromatic group having a substituent. In this context, examples of the substituent may include an alkyl group and the like. Examples of the alkyl group may include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, an n-hexyl group, an isohexyl group, a 2-ethylhexyl group, an n-heptyl group, an n-octyl group, an n-nonyl group, an n-decyl group, and the like. From the perspective of obtaining a polyvinyl alcohol even more excellent in the molecular weight distribution, hue, and water solubility, $R^1$ is preferably an aromatic group without such a substituent.

In the formula (II) above, $R^2$ denotes a hydrogen atom, an alkyl group having a carbon number from 1 to 20, or an optionally substituted aromatic group having a carbon number from 6 to 20. The alkyl group used as $R^2$ preferably has a carbon number of 10 or less, more preferably 5 or less, and even more preferably 3 or less. Examples of the alkyl group may include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, an n-hexyl group, an isohexyl group, a 2-ethylhexyl group, an n-heptyl group, an n-octyl group, an n-nonyl group, an n-decyl group, and the like, and among all, a methyl group is preferred.

From the perspective of obtaining a polyvinyl alcohol even more excellent in the molecular weight distribution and hue, $R^2$ is preferably an aromatic group. The aromatic group used as $R^2$ is preferably the same as the aromatic group used as $R^1$.

Specific examples of the polymerization terminator represented by the formula (II) above may include 1,1-diphenylethylene, styrene, α-methylstyrene, 4-tert-butylstyrene, and the like. Among all, 1,1-diphenylethylene, styrene, and α-methylstyrene are preferred, 1,1-diphenylethylene and styrene are more preferred, and 1,1-diphenylethylene is even more preferred.

The time taken for the step of polymerizing the vinyl ester monomers in total of the induction period and the growth period is usually from 3 to 50 hours. In this situation, use of a thiol compound, such as 1-propanethiol used in Non-Patent Document 3, causes production of a thio radical when the thiol compound reacts with a radical at a polymer end. Since a thio radical has reinitiation capability of polymerization reaction, it again reacts with a vinyl ester monomer and a cobalt complex. Accordingly, a thiol compound does not function as a polymerization terminator and a polyvinyl alcohol produced using such a thiol compound is colored.

The molar number of the polymerization terminator to be added represented by the formula (II) above is preferably from 1 to 100 mol based on 1 mol of the added organic cobalt complex. An excessively small molar number of the polymerization terminator causes a risk of not sufficiently trapping radicals at polymer ends to deteriorate color tone of the polyvinyl alcohol to be obtained. The molar number of the polymerization terminator is thus more preferably 3 mol or more based on 1 mol of the organic cobalt complex. Meanwhile, an excessively large molar number of the polymerization terminator causes a risk of raising production costs. The molar number of the polymerization terminator is more preferably 50 mol or less based on 1 mol of the organic cobalt complex.

A temperature of the reaction liquid in the termination step may be a temperature allowing the polymerization terminator represented by the formula (II) above to react with a radical at an end of a polyvinyl acetate chain and is preferably from 0° C. to 80° C. A temperature of the reaction liquid at less than 0° C. causes too much time taken for the termination step and reduction in productivity. In this regard, the temperature of the reaction liquid in the termination step is more preferably 10° C. or more and even more preferably 20° C. or more. Meanwhile, a temperature of the reaction liquid at more than 80° C. is prone to cause unnecessary progression of vinyl acetate polymerization and an increase in the molecular weight distribution (Mw/Mn). In this regard, the temperature is more preferably 70° C. or less and even more preferably 60° C. or less. The time taken for the termination step is from 10 minutes to 5 hours.

After the termination step, an extraction step is preferably performed by contacting an aqueous solution containing a water-soluble ligand with the polyvinyl ester solution thus obtained to extract and remove the cobalt complex from the polyvinyl ester solution. As just described, the saponification step performed after removal in advance of a cobalt complex contained in the polyvinyl ester solution allows production of a polyvinyl alcohol with good hue and less likely to be gelated. Specifically, an operation may be performed in which the aqueous solution and the polyvinyl ester solution, which are mutually insoluble, is vigorously stirred to have their interface with a greater area and then left them standing to separate the mixture into an oil layer and a water layer, followed by removal of the water layer. This operation may be repeated a plurality of times.

The water-soluble ligand used in the extraction step is preferably acid having a pKa at 25° C. from 0 to 12. Since use of strong acid having a pKa of less than 0 makes it difficult to efficiently extract a cobalt complex, the pKa is preferably 2 or more. Since use of weak acid having a pKa of more than 12 also makes it difficult to efficiently extract a cobalt complex, the pKa is preferably 7 or less. If the acid is polyacid, a first dissociation constant (pKa1) has to be in the above range. The acid having a pKa from 0 to 12 is preferably carboxylic acid or phosphoric acid (pKa1 of 2.1) and more preferably carboxylic acid. Among all, acetic acid (pKa of 4.76) is particularly preferred.

The aqueous solution containing the water-soluble ligand preferably has a pH from 0 to 5. The pH is more preferably 1 or more and even more preferably 1.5 or more. The pH is more preferably 4 or less and even more preferably 3 or less.

The polyvinyl ester thus obtained is saponified to obtain a polyvinyl alcohol. The polyvinyl alcohol has a narrow molecular weight distribution with good hue. Although not being fully clear, the reason is considered as follows. When the polymerization terminator represented by the formula (II) above is added, a radical at an end of a polyvinyl acetate chain reacts with the polymerization terminator to bond the polymerization terminator to the end of the polyvinyl ester chain. In this situation, it is considered that the aromatic group ($R^1$) derived from the polymerization terminator causes conjugation stabilization of a newly generated radical to terminate the polymerization reaction, thereby producing a polyvinyl ester having a narrow molecular weight distribution. After that, generation of a conjugated double bond is suppressed during saponification of the polyvinyl ester to allow production of a polyvinyl alcohol with a low yellowness index (YI) and good hue. In addition, the polymerization terminator represented by the formula (II) above is bonded at an end of a polyvinyl ester chain and the bulky aromatic group ($R^1$) is introduced at the end of the polyvinyl ester chain, resulting in suppression of further polymerization reaction, which is also considered to be a cause of the narrow molecular weight distribution of the polyvinyl alcohol thus obtained.

In the saponification step, the polyvinyl ester obtained in the termination step is saponified to obtain a polyvinyl alcohol. In this situation, the saponification step may be performed after the extraction step is performed after the termination step.

In the saponification step, the polyvinyl ester produced in the previously mentioned method is saponified in the state of being dissolved in alcohol or hydrous alcohol to obtain a polyvinyl alcohol. Examples of the alcohol used for the saponification reaction may include lower alcohols, such as methanol and ethanol, and methanol is particularly preferably used. The alcohol used for the saponification reaction may contain a solvent, such as acetone, esters like methyl acetate and ethyl acetate, and toluene. Examples of the catalyst used for the saponification reaction may include: hydroxides of alkali metals, such as potassium hydroxide and sodium hydroxide; alkaline catalysts, such as sodium methylate; and acidic catalysts, such as mineral acid. An appropriate temperature of the saponification reaction ranges, for example, from 20° C. to 70° C. When a gelatinous product is precipitated with progress of the saponification reaction, the product is ground at that timing and washed, followed by being dried to obtain a polyvinyl alcohol.

The polyvinyl alcohol of the present invention has a degree of saponification from 80 to 99.99 mol %. A degree of saponification of less than 80 mol % causes a severe decrease in crystallinity of the polyvinyl alcohol and a decrease in physical properties, such as mechanical strength and barrier properties, of a shaped article. The degree of saponification is preferably 85 mol % or more and more preferably 90 mol % or more. Meanwhile, a degree of saponification of more than 99.99 mol % is likely to cause difficulty in production of a polyvinyl alcohol and is prone to deteriorate the formability. The degree of saponification is preferably 99.95 mol % or less.

In the polyvinyl alcohol of the present invention, based on total monomer units, a total amount of vinyl ester units and vinyl alcohol units is preferably 50 mol % or more, more preferably 80 mol % or more, even more preferably 90 mol % or more, and particularly preferably 95 mol % or more, and may be 100 mol %.

The polyvinyl alcohol of the present invention has a number-average molecular weight (Mn) from 4,400 to 440,000. Use of the organic cobalt complex as a control agent allows production of a polyvinyl alcohol having a narrow molecular weight distribution and a high number-average molecular weight (Mn). From the perspective of obtaining shaped articles of high strength, the number-average molecular weight (Mn) is preferably 11,000 or more and more preferably 22,000 or more. Meanwhile, an excessively high number-average molecular weight (Mn) sometimes causes too high viscosity of the solution and thus difficulty in handling or sometimes causes a decrease in the rate of dissolution. The number-average molecular weight (Mn) is thus preferably 220,000 or less and more preferably 190,000 or less. The number-average molecular weight (Mn) and a weight-average molecular weight (Mw) in the present invention are values measured in a hexafluoroisopropanol (HFIP) column using polymethylmethacrylate as a reference material by gel permeation chromatography (GPC). The measurement method is described in Examples.

The polyvinyl alcohol of the present invention has a molecular weight distribution (Mw/Mn) from 1.05 to 1.70. Polymerization by controlled radical polymerization allows production of a polyvinyl alcohol having a narrow molecular weight distribution. The molecular weight distribution is preferably 1.60 or less and more preferably 1.55 or less, and even more preferably 1.45 or less. A molecular weight distribution in the above range increases crystallinity of the polyvinyl alcohol to be obtained, leading to excellent gas barrier properties of shaped articles using the polyvinyl alcohol. A molecular weight distribution in the above range and a number-average molecular weight in the above range allow production of shaped articles with high elasticity and high strength.

The polyvinyl alcohol of the present invention contains an end group represented by the formula (I) below.

(In the formula, $R^1$ denotes an optionally substituted aromatic group having a carbon number from 6 to 20, and $R^2$ denotes a hydrogen atom, an alkyl group having a carbon number from 1 to 20, or an optionally substituted aromatic group having a carbon number from 6 to 20.)

The end group is preferably derived from the polymerization terminator represented by the formula (II) above. It is considered that the polymerization terminator reacts with a radical of a polyvinyl ester chain and bonded at an end of the polyvinyl ester chain, followed by protonation of a newly generated radical to form the end group. Then, in the polyvinyl alcohol of the present invention, the molar ratio (X) of the end group represented by the formula (I) above based on total monomer units and the number-average molecular weight (Mn) satisfy the formula (1) below.

$$X \cdot Mn/44 \geq 0.5 \tag{1}$$

The left side ($X \cdot Mn/44$) of the formula (1) is a product of the molar ratio (X) of the end group represented by the formula (I) above based on the total monomer units in the polyvinyl alcohol and a number-average degree of polymerization (Mn/44). That is, $X \cdot Mn/44$ is equivalent to a ratio of polyvinyl alcohol chains having the end group to the total polyvinyl alcohol chains. Accordingly, a certain value or more of $X \cdot Mn/44$ means that the ratio of the polyvinyl alcohol chains having the end group to the total polyvinyl alcohol chains is a certain value or more. As described above, the polymerization terminator represented by the formula (II) above is bonded at an end of a polyvinyl ester chain, causing conjugation stabilization of a radical to obtain a polyvinyl alcohol having a narrow molecular weight distribution.

Moreover, as a result of investigations by the present inventors, it was found that, depending on the type of compound to terminate the polymerization reaction of vinyl ester monomers, a carbon-carbon double bond was formed at an end of a polymer main chain during saponification of the produced polyvinyl ester. It was also made clear that some of such carbon-carbon double bonds formed a mutually conjugated polyene structure and absorbed visible light, resulting in a polyvinyl alcohol colored in yellow. In this situation, the carbon-carbon double bonds causing the coloration are formed in the polymer main chain and different from a bond forming an aromatic ring in the end group represented by the formula (I) above. For example, in a case as described in Comparative Example 3 of using 1-propanethiol, not functioning as a polymerization terminator and reacting with a vinyl ester monomer and a cobalt complex, and in a case as described in Comparative Examples 2 and 6 of using TEMPO (2,2,6,6-tetramethylpiperidine 1-oxyl), being a stable radical, saponification of the produced polyvinyl ester is followed by generation of a large amount of carbon-carbon double bonds and coloring of the resulting polyvinyl alcohol is inevitable. In contrast, when the polymerization reaction of vinyl ester monomers is terminated by adding the polymerization terminator represented by the formula (II) above to introduce the end group represented by of the formula (1) above into a polyvinyl ester chain, the polyvinyl alcohol after saponification has a less carbon-carbon double bond content in the main chain to allow production of a polyvinyl alcohol with good hue. X·Mn/44 is preferably 0.65 or more and more preferably 0.8 or more. Meanwhile, X·Mn/44 is usually 2 or less. Even if such end groups are bonded with all polyvinyl alcohol chains, X·Mn/44 is 1 on calculation although an actually obtained value may be more than 1 due to an error of measurement of the number-average molecular weight (Mn) and the like.

The polyvinyl alcohol preferably has a carbon-carbon double bond content in the main chain of 0.10 mol % or less based on total monomer units of the polyvinyl alcohol, more preferably 0.07 mol % or less, and even more preferably 0.04 mol % or less, and may be 0 mol %.

The polyvinyl alcohol after the saponification step preferably has a cobalt element content from 0.01 to 50 ppm. A cobalt element content of more than 50 ppm is prone to cause worse hue and also worse thermal stability. The cobalt element content is more preferably 20 ppm or less and even more preferably 10 ppm or less. Meanwhile, having a cobalt element content of less than 0.01 ppm costs too much for removal work and is not industrially realistic.

The polyvinyl alcohol of the present invention preferably has a yellowness index (YI) of 50 or less. The yellowness index (YI) is measured in accordance with ASTM D1925. A polyvinyl alcohol having a smaller carbon-carbon double bond content (X) as described above achieves a polyvinyl alcohol having a low YI with excellent hue. The YI is more preferably 40 or less, even more preferably 30 or less, and particularly preferably 20 or less. In this context, the YI is obtained by measuring a sample of powder of a polyvinyl alcohol spread over a laboratory dish not to press the powder using a spectrophotometric colorimeter (D65 light source, CM-A120 white calibration plate, specular reflection measurement SCE). Specifically, the YI is a value measured in accordance with the method described in Examples.

The polyvinyl alcohol of the present invention preferably has a 1,2-glycol bond content from 0.7 to 1.5 mol %. A 1,2-glycol bond content of 1.5 mol % or less allows a polyvinyl alcohol to have higher crystallinity. In addition to a low molecular weight distribution (Mw/Mn), it is possible to have even higher crystallinity. The 1,2-glycol bond content is more preferably 1.4 mol % or less and even more preferably 1.3 mol % or less. Meanwhile, a 1,2-glycol bond content of less than 0.7 mol % is prone to cause a decrease in handling properties, such as reduced water solubility. The 1,2-glycol bond content is more preferably 0.9 mol % or more and even more preferably 1.1 mol % or more.

Examples of the method for molding the polyvinyl alcohol of the present invention may include a method comprising forming from the form of a solution, such as water and dimethyl sulfoxide, and a method comprising forming by heating for plasticization of a polyvinyl alcohol, for example, extrusion molding, injection molding, inflation molding, press molding, blow molding, and the like. By these methods, shaped articles are obtained in an arbitrary shape, such as fiber, a film, a sheet, a tube, and a bottle.

In the polyvinyl alcohol of the present invention, various additives may be blended as long as the effects of the present invention are not impaired. Examples of the additives may include fillers, process stabilizers such as a copper compound, weathering agents, colorants, ultraviolet absorbers, light stabilizers, antioxidants, antistatic agents, flame retardants, plasticizers, other resins such as starch, lubricants, perfumes, defoamers, deodorants, extenders, removers, mold releases, reinforcements, crosslinkers, mildewcides, antiseptics, crystallization retardants, and the like.

The polyvinyl alcohol of the present invention is applicable to various types of use utilizing its properties. Examples of such use may include surfactants, paper coating agents, paper internal agents, pigment binders, adhesives, nonwoven fabric binders, paints, fiber treating agents, fiber sizings, dispersion stabilizers, films, sheets, bottles, fibers, thickeners, flocculants, soil improvers, and the like.

EXAMPLES

The present invention is described below more in detail by way of Examples. Note that the present invention is not limited at all by Examples below. Polyvinyl alcohols were measured and evaluated in the following methods.

[Measurement of Number-Average Molecular Weight (Mn) and Molecular Weight Distribution (Mw/Mn)]

Using a size exclusion high speed liquid chromatograph "HLC-8320GPC" manufactured by Tosoh Corp., a number-average molecular weight (Mn) and a molecular weight distribution (Mw/Mn) were measured. Measurement conditions were as follows.

Column: two HFIP columns "GMHHR-H(S)" manufactured by Tosoh Corp., serial connection Reference material: polymethylmethacrylate Solvent and mobile phase: sodium trifluoroacetate-HFIP solution (concentration of 20 mM)

Flow rate: 0.2 mL/min.

Temperature: 40° C.

Sample solution concentration: 0.1 wt % (filtered through a filter with an opening diameter of 0.45 μm)

Injected amount: 10 μL

Detector: RI

[Measurement of Molar Ratio (X) of End Group Represented by Formula (I) Above Based on Total Monomer Units]

Using a nuclear magnetic resonance apparatus "LAMBDA 500" manufactured by JEOL Ltd., the polyvinyl alcohol was $^1$H-NMR measured at 40° C. and 95° C. As the solvent, DMSO-$d_6$ was used. The molar ratio (X) of the end group represented by the formula (I) above of the polyvinyl alcohol based on the total monomer units was calculated as follows. Calculations were performed on a total integral A (3.3 ppm, 3.4 ppm, 3.5 ppm, 3.6 ppm, 3.9 ppm, and 4.8 ppm; among them, for the four peaks from 3.3 to 3.6 ppm, each integral was calculated from comparison of measurements at 40° C./95° C.) of peaks derived from a methine proton (—CH$_2$CH(OH)— or —CH$_2$CH(OCOCH$_3$)—) of a known polyvinyl alcohol and an integral B of all peaks detected in a range from 5.5 to 7.5 ppm. In calculation of the integral between 5.5 and 7.5 ppm, when a baseline was tilted, an area of each peak was calculated considering the tilt. A ratio of a value obtained by dividing the integral B by the number of hydrogen atoms bonded with an aromatic ring in the end group represented by the formula (I) above (B/the number of hydrogen atoms bonded with aromatic ring) to the integral A [(B/the number of hydrogen atoms bonded with aromatic ring)/A] is defined as the molar ratio (X). The molar ratios (X) for R$^1$ and R$^2$ being phenyl groups and for R$^1$ being a phenyl group and R$^2$ being a hydrogen atom or an alkyl group are obtained by the following formulae. For R$^1$ and R$^2$ being phenyl groups:

$$X=(B/10)/A$$

For R$^1$ being a phenyl group and R$^2$ being a hydrogen atom or an alkyl group:

$$X=(B/5)/A$$

[Measurement of Carbon-Carbon Double Bond Content (X) (Mol %)]

Using a nuclear magnetic resonance apparatus "LAMBDA 500" manufactured by JEOL Ltd., the polyvinyl alcohol was $^1$H-NMR measured at 40° C. and 95° C. As the solvent, DMSO-d$_6$ was used. The carbon-carbon double bond content (X) (mol %) of the polyvinyl alcohol based on the total monomer units was calculated as follows. Assuming that a total integral (3.3 ppm, 3.4 ppm, 3.5 ppm, 3.6 ppm, 3.9 ppm, and 4.8 ppm; among them, for the four peaks from 3.3 to 3.6 ppm, each integral was calculated from comparison of measurements at 40° C./95° C.) of peaks derived from a methine proton (—CH$_2$CH(OH)— or —CH$_2$CH(OCOCH$_3$)—) of a known polyvinyl alcohol is 100, an integral of all peaks detected in a range of 5.5 ppm or more and less than 7.1 ppm was calculated to define ½ of the value as the carbon-carbon double bond content of the main chain in the polyvinyl alcohol (mol %). In calculation of the integral of 5.5 ppm or more and less than 7.5 ppm, when a baseline was tilted, an area of each peak was calculated considering the tilt.

[Measurement of Amount of 1,2-Glycol Bonds (Mol %)]

A polyvinyl alcohol dried under reduced pressure at 90° C. for 2 days was dissolved in DMSO-d$_6$ and several drops of trifluoroacetic acid were added to prepare a sample for measurement. Using a nuclear magnetic resonance apparatus "LAMBDA 500" manufactured by JEOL Ltd., $^1$H-NMR measurement was performed at 80° C. In this situation, for a sample having a degree of saponification of less than 99.9 mol %, the sample was saponified to 99.9 mol % or more and then served for the measurement. Peaks derived from methine in the vinyl alcohol units were attributed to 3.2 to 4.0 ppm (integral C) and a peak derived from one methine in the 1,2-glycol bond was attributed to 3.25 ppm (integral D). It was then possible to calculate the 1,2-glycol bond content by a formula below.

$$\text{Amount of 1,2-Glycol Bonds (mol \%)}=(D/C)\times 100$$

[Measurement of Cobalt Element Content]

To a polyvinyl alcohol equivalent to 0.5 g of solid content, concentrated nitric acid was added, and heated and dissolved and then diluted with ion-exchange water to obtain 20 mL of a nitric acid solution of the polyvinyl alcohol. From the cobalt concentration of the solution measured with an ICP emission spectrometer (IRIS-AP, manufactured by Nippon Jarrell-Ash Co. Ltd.), the cobalt content (ppm) in the polyvinyl alcohol was obtained.

[Evaluation of Hue (YI)]

The YI (ASTM D1925) of the produced polyvinyl alcohol was measured using a spectrophotometric colorimeter "CM-8500d" manufactured by Konica Minolta, Inc. (light source: D65, CM-A120 white calibration plate, CM-A126 laboratory dish set used, specular reflection measurement SCE, measured diameter of ϕ30 mm). To the laboratory dish, 5 g of the sample was added, a side was tapped for shaking not to press the powder, and the powder was evenly and uniformly spread. In this condition, measurement was performed 10 times in total (each time, the laboratory dish was shaken once before remeasurement) and an average of them was obtained as the YI of the resin.

[Evaluation of Rate of Dissolution in Water]

The polyvinyl alcohol was added to ion-exchange water to have the concentration of 4 mass % and was stirred at 100° C. for dissolution. The dissolution performance was determined by the following criteria.

A: completely dissolved within 1 hour after a temperature rise.

B: completely dissolved between 1 and 3 hours after a temperature rise.

C: completely dissolved between 3 and 6 hours after a temperature rise.

D: completely dissolved between 6 and 12 hours after a temperature rise.

E: taken time of more than 12 hours after a temperature rise until complete dissolution or not completely dissolved with, for example, developing cloudy points.

[Evaluation of Percentage of Saturated Water Content]

An aqueous polyvinyl alcohol solution with a concentration of 10 mass % was prepared and casted in a mold made of PET to be left standing in a room controlled at 20° C., 21% RH for 1 week for drying. A film thus obtained was removed from the mold and a central film thickness was measured with a thickness gauge to determine films with a film thickness from 100 to 200 μm as evaluation objects. Such a film thus obtained was conditioned at 20° C., 80% RH for 1 week and then a part of the film was cut out to measure the percentage [mass %] of saturated water content of the film with a halogen moisture analyzer (setting temperature of 150° C.).

[Evaluation of Mechanical Properties]

The film used for evaluation of the percentage of saturated water content and left standing in a room controlled at 20° C., 80% RH for 1 week for drying was cut out in 10 mm×800 mm and subjected to strength-elongation measurement using an autograph "AG-IS" manufactured by Shimadzu Corp. in the conditions of a distance between chucks of 50 mm and a tensile speed of 500 mm/min. to obtain a modulus of elasticity [kgf/mm$^2$] and a maximum stress [kgf/mm$^2$] in the conditions of 20° C., 80% RH. The measurement was performed 5 times for each sample to calculate an average of them.

[Evaluation of Oxygen Transmission Rate]

In a technique similar to that of evaluation of mechanical properties previously mentioned, a film was prepared. The film thus obtained was conditioned at 20° C., 85% RH for 1 week and then the oxygen transmission rate (cc/[m$^2$·day·atm]) was measured in accordance with a method described in JIS K7126 (equal pressure method) in the conditions of 20° C., 85% RH using MOCON OX-TRAN 2/20 type manufactured by Modem Controls Inc. to calculate the oxygen transmission rate (cc·20 μm/[m²·day·atm]) converted to be equivalent to a film thickness of 20 μm.

Example 1

To a reactor provided with a stirrer, a reflux condenser tube, and an initiator addition port, 0.24 part by mass of cobalt (II) acetylacetonate as an organic cobalt complex and 0.86 part by mass of 2,2'-azobis(4-methoxy-2,4-dimethylvaleronitrile) as a radical initiator were added. Inert gas purge was performed three times in which inside the reactor was vacuumed and then nitrogen was introduced. After that, 640 parts by mass of vinyl acetate purified by simple distillation was added, followed by immersion of the reactor in a water bath and heating to have an internal temperature at 30° C. and stirring. Sampling was appropriately performed and progress of the polymerization was confirmed from the solid content concentration. When the conversion of vinyl acetate reached 25%, 3.4 parts by mass of 1,1-diphenylethylene was added as a polymerization terminator and stirred at 30° C. After adding the polymerization terminator, 600 parts by mass of an aqueous acetic acid solution (pH of 2.0) with a concentration of 25 mass % was further added and stirred for 5 minutes and then left standing for 30 minutes to be separated into two layers. After a water layer was drawn out, the solution was dropped in deionized water for precipitation of polyvinyl acetate. Polyvinyl acetate was recovered by filtration operation and dried in a vacuum drier at 40° C. for 24 hours to obtain polyvinyl acetate. Details of the polymerization step described above are shown in Table 1.

Then, to a reactor same as above, 100 parts by mass of polyvinyl acetate thus obtained and 400 parts by mass of methanol were added and dissolved and then the water bath was heated until an internal temperature reached 40° C. while heating and stirring. Here, 66.4 parts by mass of a methanol solution (concentration of 14 mass %) of sodium hydroxide was added and saponified at 40° C. (9.3 parts by mass as sodium hydroxide). A gel product thus generated was ground by a grinder and further left at 40° C. for progress of saponification for 1 hour. To a saponified product thus obtained, 66.4 parts by mass of a methanol solution (concentration of 14 mass %) of sodium hydroxide was further added to drive the saponification reaction for additional 1 hour in heat reflux at 65° C. After that, 200 parts by mass of methyl acetate was added to neutralize the remaining alkali. Termination of the neutralization was confirmed using a phenolphthalein indicator, followed by filtration to obtain a solid. To the solid, 500 parts by mass of methanol was added for heat reflux for 1 hour. After that, a solid obtained by centrifugal dewatering was dried in a vacuum drier at 40° C. for 24 hours to yield an intended polyvinyl alcohol. Details of the saponification step described above are shown in Table 2.

Various properties of the polyvinyl alcohol thus produced were measured to evaluate the performance. The degree of saponification was 99.9 mol %, the number-average molecular weight (Mn) was 88,100, the molecular weight distribution (Mw/Mn) was 1.35, X·Mn/44 was 1, the cobalt content was 0.8 ppm, the hue (YI) was 17.0, evaluation of the rate of dissolution in water was A, the percentage of saturated water content was 13.1 mass %, the modulus of elasticity was 13.0 kgf/mm², the maximum stress was 4.1 kgf/mm², and the oxygen transmission rate was 39.1 cc·20 μm/(m²·day·atm). The above results are shown in Table 3.

Example 2

Polymerization reaction of vinyl acetate was performed in the same conditions as those in Example 1. When the conversion of vinyl acetate reached 25%, 0.8 part by mass of 1,1-diphenylethylene was added as a polymerization terminator and stirred at 30° C. The same operations were conducted later as those in the method described in Example 1 to obtain a polyvinyl acetate. Details of the polymerization step described above are shown in Table 1.

Then, two-step saponification reaction was conducted in the same method as that described in Example 1 other than changing the amount of the methanol solution (concentration of 14 mass %) of sodium hydroxide to be added to a reactor same as above based on 100 parts by mass of the polyvinyl acetate thus obtained to 16.6 parts by mass (2.3 parts by mass as sodium hydroxide) to yield an intended polyvinyl alcohol. Details of the saponification step are shown in Table 2. The results of measurement and evaluation of the polyvinyl alcohol thus produced are shown in Table 3.

Example 3

Polymerization reaction of vinyl acetate was performed in the same conditions as Example 1. When the conversion of vinyl acetate reached 20%, 1.9 parts by mass of styrene was added as a polymerization terminator and stirred at 30° C. The same operations were conducted later as those in the method described in Example 1 to obtain a polyvinyl acetate. Details of the polymerization step described above are shown in Table 1.

Then, to a reactor same as above, based on 100 parts by mass of the polyvinyl acetate thus obtained, 400 parts by mass of methanol was added and dissolved and then the water bath was heated until an internal temperature reached 40° C. while heating and stirring. Here, 10.0 parts by mass of a methanol solution (concentration of 14 mass %) of sodium hydroxide was added and saponified at 40° C. (1.4 parts by mass as sodium hydroxide). A gel product thus generated was ground by a grinder and further left at 40° C. for progress of saponification for 1 hour, and then 200 parts by mass of methyl acetate was added to neutralize the remaining alkali. Termination of the neutralization was confirmed using a phenolphthalein indicator, followed by filtration to obtain a solid. To the solid, 500 parts by mass of methanol was added for heat reflux for 1 hour. After that, a solid obtained by centrifugal dewatering was dried in a vacuum drier at 40° C. for 24 hours to yield an intended polyvinyl alcohol. Details of the saponification step are shown in Table 2. The results of measurement and evaluation of the polyvinyl alcohol thus produced are shown in Table 3.

Example 4

Polymerization reaction of vinyl acetate was performed in the same conditions as those in Example 1 other than changing the amount of cobalt (II) acetylacetonate to 0.08 part by mass and 2,2'-azobis(4-methoxy-2,4-dimethylvaleronitrile) to 0.29 part by mass. When the conversion of vinyl acetate reached 25%, 0.7 part by mass of α-methylstyrene was added as a polymerization terminator and stirred at 30° C. The same operations were conducted later as those in the method described in Example 1 to obtain a polyvinyl acetate. Details of the polymerization step described above are shown in Table 1.

Then, the same operations were conducted as those in the method described in Example 3 other than changing the amount of the methanol solution (concentration of 14 mass %) of sodium hydroxide to be added to a reactor same as above based on 100 parts by mass of the polyvinyl acetate thus obtained to 3.3 parts by mass (0.5 part by mass as sodium hydroxide) to yield a polyvinyl alcohol. Details of the saponification step are shown in Table 2. The results of measurement and evaluation of the polyvinyl alcohol thus produced are shown in Table 3.

Comparative Example 1

In a reactor provided with a stirrer, a reflux condenser tube, an argon inlet tube, and an initiator addition port, 640 parts by mass of vinyl acetate and 270 parts by mass of methanol were charged. Inside the reactor was subjected to inert gas purge for 30 minutes while nitrogen bubbling. A water bath was heated to start a temperature rise of the reactor, and when an internal temperature reached 60° C., 0.17 part by mass of azobisisobutyronitrile was added as an initiator to start polymerization. Sampling was appropriately performed and progress of the polymerization was confirmed from the solid content concentration. When the conversion of vinyl acetate reached 30%, the water bath was cooled to 30° C. to terminate the polymerization. The reactor was connected to a vacuum line to distill off the residual vinyl acetate together with methanol at 30° C. under reduced pressure. During visual confirmation of inside the reactor, distillation was continued while methanol was appropriately added upon a viscosity rise to obtain a methanol solution of polyvinyl acetate. Details of the polymerization step described above are shown in Table 1.

Saponification reaction was conducted in the same method as that described in Example 3 other than further adding methanol to the methanol solution (150 parts by mass as polyvinyl acetate) of polyvinyl acetate thus obtained to have the concentration of polyvinyl acetate of 20 mass % and changing the amount of the added methanol solution (concentration of 14 mass %) of sodium hydroxide to 10.0 parts by mass (1.4 parts by mass as sodium hydroxide) based on 150 parts by mass of the polyvinyl acetate thus obtained to obtain a polyvinyl alcohol. Details of the saponification step are shown in Table 2. The results of measurement and evaluation of the polyvinyl alcohol thus produced are shown in Table 3.

Comparative Example 2

To a reactor provided with a stirrer, a reflux condenser tube, and an initiator addition port, 3.83 parts by mass of cobalt (II) acetylacetonate as an organic cobalt complex and 13.75 parts by mass of 2,2'-azobis(4-methoxy-2,4-dimethylvaleronitrile) as a radical initiator were added. Inert gas purge was performed three times in which inside the reactor was vacuumed and then nitrogen was introduced. After that, 640 parts by mass of vinyl acetate purified by simple distillation was added, followed by immersion of the reactor in a water bath and heating to have an internal temperature at 30° C. and stirring. Sampling was appropriately performed and progress of the polymerization was confirmed from the solid content concentration. When the conversion of vinyl acetate reached 30%, the water bath was substituted to iced water bath for rapidly cooling the reactor to have the internal temperature of 10° C. or less. Here, 46.4 parts by mass of TEMPO was added as a polymerization terminator. After adding the polymerization terminator, the reactor was connected to a vacuum line to distill off the residual vinyl acetate at 15° C. under reduced pressure. During visual confirmation of inside the reactor, distillation was continued while methanol was appropriately added upon a viscosity rise and the internal temperature was raised to 40° C. while stirring for 1 hour. After that, the reactor was cooled to 30° C., and while adding ethyl acetate, methanol was distilled off at 35° C. under reduced pressure to obtain an ethyl acetate solution of polyvinyl acetate. Here, 600 parts by mass of an aqueous acetic acid solution (pH of 2.0) with a concentration of 25 mass % was added and stirred for 5 minutes and then left standing for 30 minutes to be separated into two layers. After a water layer was drawn out, the reactor was connected to a vacuum line to distill off the residual vinyl acetate at 30° C. under reduced pressure. When the vinyl acetate was distilled off, methanol was added to dissolve polyvinyl acetate and the solution was dropped in deionized water for precipitation of polyvinyl acetate. Polyvinyl acetate was recovered by filtration operation and dried in a vacuum drier at 40° C. for 24 hours to obtain polyvinyl acetate. Details of the polymerization step described above are shown in Table 1.

Then, to a reactor same as above, 150 parts by mass of the polyvinyl acetate thus obtained and 225 parts by mass of methanol were added to have a concentration of polyvinyl acetate at 40 mass % and then the water bath was heated until an internal temperature reached 40° C. while heating and stirring. Here, 49.8 parts by mass of a methanol solution (concentration of 14 mass %) of sodium hydroxide was added (7.0 parts by mass as sodium hydroxide), and even though marked coloring (dark brown) was found at the moment of addition, saponification was performed at 40° C. with no additional operation. A gel product thus generated was ground by a grinder and further left at 40° C. for progress of saponification for 1 hour. To a saponified product thus obtained, 49.8 parts by mass of a methanol solution (concentration of 14 mass %) of sodium hydroxide was further added to drive the saponification reaction for additional 1 hour in heat reflux at 65° C. After that, 200 parts by mass of methyl acetate was added to neutralize the remaining alkali. Termination of the neutralization was confirmed using a phenolphthalein indicator, followed by filtration to obtain a solid. To the solid, 500 parts by mass of methanol was added for heat reflux for 1 hour. After that, a solid obtained by centrifugal dewatering was dried in a vacuum drier at 40° C. for 24 hours to obtain a polyvinyl alcohol. Details of the saponification step are shown in Table 2. The results of measurement and evaluation of the polyvinyl alcohol thus produced are shown in Table 3.

Comparative Example 3

Polymerization reaction of vinyl acetate was performed in the same conditions as those in Example 1 other than adding 1.91 parts by mass of cobalt (II) acetylacetonate and 6.88 parts by mass of 2,2'-azobis(4-methoxy-2,4-dimethylvaleronitrile). When the conversion of vinyl acetate reached 30%, 11.3 parts by mass of 1-propanethiol was added. An internal temperature was raised at 50° C. and heated and stirred for 2 hours, and marked coloring (black) was found. The reactor was opened to atmosphere and the reaction liquid thus obtained was passed through an alumina column, followed by extraction with methyl acetate. The vinyl acetate and methyl acetate remained in an extract thus obtained were distilled off at 40° C. under reduced pressure. When vinyl acetate and methyl acetate were distilled off, methanol was added to dissolve polyvinyl acetate and the solution was dropped in deionized water for precipitation of polyvinyl acetate, followed by filtration to obtain a solid. The solid was dried in a vacuum drier at 40° C. for 24 hours to obtain polyvinyl acetate. Details of the polymerization step described above are shown in Table 1.

Then, to a reactor same as above, 150 parts by mass of polyvinyl acetate thus obtained and 225 parts by mass of methanol were added to have a concentration of polyvinyl acetate at 40 mass % and then the water bath was heated until an internal temperature reached 40° C. while heating and stirring. Here, 49.8 parts by mass of a methanol solution (concentration of 14 mass %) of sodium hydroxide was added (7.0 parts by mass as sodium hydroxide), and even though marked coloring (dark brown to black) was found at the moment of addition, saponification was performed at 40° C. with no additional operation. A gel product thus generated was ground by a grinder and further left at 40° C. for progress of saponification for 1 hour. To a saponified product thus obtained, 49.8 parts by mass of a methanol solution (concentration of 14 mass %) of sodium hydroxide was further added to drive the saponification reaction for additional 1 hour in heat reflux at 65° C. After that, 200 parts by mass of methyl acetate was added to neutralize the remaining alkali. Termination of the neutralization was confirmed using a phenolphthalein indicator, followed by filtration to obtain a solid. To the solid, 500 parts by mass of methanol was added for heat reflux for 1 hour. After that, a solid obtained by centrifugal dewatering was dried in a vacuum drier at 40° C. for 24 hours to yield a polyvinyl alcohol. Details of the saponification step are shown in Table 2. The results of measurement and evaluation of the polyvinyl alcohol thus produced are shown in Table 3.

Comparative Example 4

Polymerization reaction of vinyl acetate was performed in the same conditions as those in Example 1. When the conversion of vinyl acetate reached 25%, 0.1 part by mass of 1,1-diphenylethylene was added as a polymerization terminator and stirred at 30° C. The same operations were conducted later as those in the method described in Example 1 to obtain a polyvinyl acetate. Details of the polymerization step described above are shown in Table 1.

Then, saponification reaction of the polyvinyl acetate thus obtained was conducted in the same method as that described in Example 3 to obtain a polyvinyl alcohol. Details of the saponification step are shown in Table 2. The results of measurement and evaluation of the polyvinyl alcohol thus produced are shown in Table 3.

Comparative Example 5

Polymerization reaction of vinyl acetate was performed in the same conditions as those in Example 1. When the conversion of vinyl acetate reached 15%, 0.8 part by mass of 1,1-diphenylethylene was added as a polymerization terminator and stirred at 30° C. The same operations were conducted later as those in the method described in Example 1 to obtain a polyvinyl acetate. Details of the polymerization step described above are shown in Table 1.

Then, the same operations were conducted as those in the method described in Example 3 other than changing the amount of the methanol solution (concentration of 14 mass %) of sodium hydroxide to be added to a reactor same as above based on 100 parts by mass of the polyvinyl acetate thus obtained to 1.3 parts by mass (0.2 part by mass as sodium hydroxide) to yield a polyvinyl alcohol. Details of the saponification step are shown in Table 2. The results of measurement and evaluation of the polyvinyl alcohol thus produced are shown in Table 3.

Comparative Example 6

Polymerization reaction of vinyl acetate was performed in the same conditions as those in Example 1 other than adding 3.83 parts by mass of cobalt (II) acetylacetonate and 13.80 parts by mass of 2,2'-azobis(4-methoxy-2,4-dimethylvaleronitrile) as an initiator. When the conversion of vinyl acetate reached 18%, 46.4 parts by mass of TEMPO was added. An internal temperature was raised at 40° C. and heated and stirred for 1 hour. After that, the same operations were conducted later as those in the method described in Comparative Example 2 to obtain a polyvinyl acetate. Details of the polymerization step described above are shown in Table 1.

Then, saponification reaction was conducted in the same method as that described in Example 3 other than adding 80 parts by mass of the polyvinyl acetate thus obtained and 98 parts by mass of methanol to a reactor same as above to have a concentration of polyvinyl acetate at 45 mass %, changing the amount of the added methanol solution (concentration of 14 mass %) of sodium hydroxide to 26.6 parts by mass (3.7 parts by mass as sodium hydroxide) based on 80 parts by mass of the polyvinyl acetate thus obtained, and changing the reaction temperature to 50° C. to obtain an intended polyvinyl alcohol. Details of the saponification step are shown in Table 2. The results of measurement and evaluation of the polyvinyl alcohol thus produced are shown in Table 3. The produced polyvinyl alcohol had a low number-average molecular weight and was not appropriate for the evaluation on the physical properties. Accordingly, as shown in Table 3, some of the evaluation were not conducted.

TABLE 1

|  | VAc Added Amount [parts by mass] | Solvent Type | Solvent Added Amount [parts by mass] | Initiator Type | Initiator Added Amount [parts by mass] | Control Agent Type | Control Agent Added Amount [parts by mass] |
|---|---|---|---|---|---|---|---|
| Example 1 | 640 | — | — | 1) | 0.86 | $Co(acac)_2$ | 0.24 |
| Example 2 | 640 | — | — | 1) | 0.86 | $Co(acac)_2$ | 0.24 |
| Example 3 | 640 | — | — | 1) | 0.86 | $Co(acac)_2$ | 0.24 |
| Example 4 | 640 | — | — | 1) | 0.29 | $Co(acac)_2$ | 0.08 |
| Comparative Example 1 | 640 | Methanol | 270 | 2) | 0.17 | — | — |
| Comparative Example 2 | 640 | — | — | 1) | 13.75 | $Co(acac)_2$ | 3.83 |
| Comparative Example 3 | 640 | — | — | 1) | 6.88 | $Co(acac)_2$ | 1.91 |
| Comparative Example 4 | 640 | — | — | 1) | 0.86 | $Co(acac)_2$ | 0.24 |
| Comparative Example 5 | 640 | — | — | 1) | 0.86 | $Co(acac)_2$ | 0.24 |
| Comparative Example 6 | 640 | — | — | 1) | 13.80 | $Co(acac)_2$ | 3.83 |

TABLE 1-continued

|  | Polymerization Temperature [° C.] | Terminator Type | Terminator Added Amount [parts by mass] | Termination Temperature [° C.] |
|---|---|---|---|---|
| Example 1 | 30 | 1,1-diphenylethylene | 3.4 | 30 |
| Example 2 | 30 | 1,1-diphenylethylene | 0.8 | 30 |
| Example 3 | 30 | Styrene | 1.9 | 30 |
| Example 4 | 30 | α-methylstyrene | 0.7 | 30 |
| Comparative Example 1 | 60 | — | — | 30 |
| Comparative Example 2 | 30 | TEMPO | 46.4 | 40 |
| Comparative Example 3 | 30 | Propanethiol | 11.3 | 50 |
| Comparative Example 4 | 30 | 1,1-diphenylethylene | 0.1 | 30 |
| Comparative Example 5 | 30 | 1,1-diphenylethylene | 0.8 | 30 |
| Comparative Example 6 | 30 | TEMPO | 46.4 | 40 |

1) 2,2'-azobis(4-methoxy-2,4-dimethylvaleronitrile)
2) Azobisisobutyronitrile

TABLE 2

|  | Saponification Step | | | | | |
|---|---|---|---|---|---|---|
|  | PVAc Added Amount [parts by mass] | PVAc Concentration [mass %] | Total Amount of Added Alkali [parts by mass] | Reaction Temperature [° C.] | Reaction Time [h] | Degree of Saponification [mol %] |
| Example 1 | 100 | 20 | 18.6 | 40-65 | 2 | 99.9 |
| Example 2 | 100 | 20 | 4.7 | 40-65 | 2 | 99.8 |
| Example 3 | 100 | 20 | 1.4 | 40 | 1 | 98.5 |
| Example 4 | 100 | 20 | 0.5 | 40 | 1 | 90.3 |
| Comparative Example 1 | 150 | 20 | 1.4 | 40 | 1 | 95.0 |
| Comparative Example 2 | 150 | 40 | 14.0 | 40-65 | 2 | 99.9 |
| Comparative Example 3 | 150 | 40 | 14.0 | 40-65 | 2 | 99.9 |
| Comparative Example 4 | 100 | 20 | 1.4 | 40 | 1 | 98.5 |
| Comparative Example 5 | 100 | 20 | 0.2 | 40 | 1 | 74.5 |
| Comparative Example 6 | 80 | 45 | 3.7 | 50 | 1 | 99.9 |

TABLE 3

|  | Mn | Mw/Mn | X · Mn/44 | Carbon-Carbon Double Bond Content [mol %] | 1,2-Glycol Bond Content [mol %] | Cobalt Content [ppm] | Hue YI |
|---|---|---|---|---|---|---|---|
| Example 1 | 88,100 | 1.35 | 1 | 0.04 | 1.18 | 0.8 | 17.0 |
| Example 2 | 88,200 | 1.36 | 0.7 | 0.05 | 1.17 | 1.2 | 19.8 |
| Example 3 | 105,600 | 1.51 | 0.7 | 0.06 | 1.18 | 2.2 | 35.6 |
| Example 4 | 274,500 | 1.60 | 0.6 | 0.06 | 1.19 | 2.0 | 30.4 |
| Comparative Example 1 | 36,230 | 2.45 | — | <0.001 | 1.62 | — | 4.6 |
| Comparative Example 2 | 6,640 | 1.57 | — | 0.27 | 1.15 | 19.1 | 108.5 |
| Comparative Example 3 | 13,260 | 1.65 | — | 0.15 | 1.16 | 10.6 | 166.1 |
| Comparative Example 4 | 88,500 | 1.38 | 0.3 | 0.11 | 1.18 | 5.0 | 52.1 |
| Comparative Example 5 | 53,000 | 1.40 | 0.7 | 0.05 | 1.17 | 3.0 | 20.0 |
| Comparative Example 6 | 3,720 | 1.39 | — | 0.54 | 1.15 | 20.5 | 179.2 |

|  | Rate of Dissolution in Water | Percentage of Saturated Water Content [mass %] | Modulus of Elasticity [kgf/mm²] | Maximum Stress [kgf/mm²] | Oxygen Transmission Rate [cc · 20 μm/(m² · day · atm)] |
|---|---|---|---|---|---|
| Example 1 | A | 13.1 | 13.0 | 4.1 | 39.1 |
| Example 2 | A | 13.6 | 12.9 | 4.0 | 39.8 |
| Example 3 | A | 14.2 | 12.4 | 4.2 | 45.5 |
| Example 4 | B | 15.5 | 6.2 | 4.3 | 96.3 |
| Comparative Example 1 | A | 17.8 | 5.6 | 3.3 | 135.6 |
| Comparative Example 2 | A | 13.9 | 7.4 | 1.5 | 90.4 |
| Comparative Example 3 | D | 12.1 | 9.8 | 1.7 | 92.3 |
| Comparative Example 4 | B | 14.3 | 11.4 | 3.8 | 50.0 |
| Comparative Example 5 | A | 19.6 | 0.8 | 1.8 | 418.6 |
| Comparative Example 6 | C | — | — | — | — |

The invention claimed is:

1. A polyvinyl alcohol having
a number-average molecular weight (Mn) of from 4,400 to 440,000,
a molecular weight distribution (Mw/Mn) of from 1.05 to 1.70, and
a degree of saponification of from 80 to 99.99 mol %, wherein
the polyvinyl alcohol comprises an end group of a formula (I):

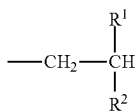  (I)

wherein $R^1$ is an optionally substituted aromatic group having a carbon number from 6 to 20, and $R^2$ is a hydrogen atom, an alkyl group having a carbon number from 1 to 20, or an optionally substituted aromatic group having a carbon number from 6 to 20, and
a molar ratio (X) of the end group based on total monomer units and the number-average molecular weight (Mn) satisfy a formula (1):

$$X \cdot Mn/44 \geq 0.5 \qquad (1).$$

2. The polyvinyl alcohol according to claim 1, wherein $R^1$ and $R^2$ are optionally substituted phenyl groups.

3. The polyvinyl alcohol according to claim 1, wherein a yellowness index (YI) measured in accordance with ASTM D1925 is 50 or less.

4. The polyvinyl alcohol according to claim 1, wherein a 1,2-glycol bond content is from 0.7 to 1.5 mol %.

5. A method for producing a polyvinyl alcohol, the method comprising:
polymerizing vinyl ester monomers by controlled radical polymerization in the presence of a radical initiator and an organic cobalt complex;
terminating the polymerizing by adding a terminator after the polymerizing to obtain a polyvinyl ester; and
saponifying the polyvinyl ester to obtain the polyvinyl alcohol,
wherein the terminator is a compound of a formula (II):

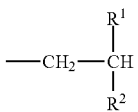  (II)

wherein $R^1$ is an optionally substituted aromatic group having a carbon number from 6 to 20, and $R^2$ is a hydrogen atom, an alkyl group having a carbon number from 1 to 20, or an optionally substituted aromatic group having a carbon number from 6 to 20.

6. The method according to claim 5, wherein the polyvinyl alcohol has
a number-average molecular weight (Mn) of from 4,400 to 440,000,
a molecular weight distribution (Mw/Mn) of from 1.05 to 1.70, and
a degree of saponification of from 80 to 99.99 mol %.

7. The method according to claim 5, wherein, in the polymerizing, from 0.001 to 1 mol of the organic cobalt complex is used based on 100 mol of the vinyl ester monomers.

8. The method according to claim 5, wherein, in the terminating, from 1 to 100 mol of the terminator is added based on 1 mol of the organic cobalt complex.

9. The method according to claim 5, wherein
the polyvinyl alcohol comprises an end group of a formula (I):

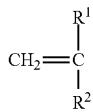  (I)

wherein $R^1$ is an optionally substituted aromatic group having a carbon number from 6 to 20, and $R^2$ is a hydrogen atom, an alkyl group having a carbon number from 1 to 20, or an optionally substituted aromatic group having a carbon number from 6 to 20, and
a molar ratio (X) of the end group based on total monomer units and the number-average molecular weight (Mn) satisfy a formula (1):

$$X \cdot Mn/44 \geq 0.5 \qquad (1).$$

10. The method according to claim 5, wherein the polyvinyl alcohol has a yellowness index (YI) measured in accordance with ASTM D1925 of 50 or less.

11. The method according to claim 5, wherein $R^1$ and $R^2$ are optionally substituted phenyl groups.

12. The method according to claim 5, wherein the polyvinyl alcohol has a 1,2-glycol bond content from 0.7 to 1.5 mol %.

* * * * *